United States Patent [19]
Shults

[11] Patent Number: 5,716,020
[45] Date of Patent: Feb. 10, 1998

[54] ELECTRIC ROTARY TYING DEVICE SYSTEM

[76] Inventor: James H. Shults, 1670 Ptarmigan Ridge Cir., Grand Junction, Colo. 81506

[21] Appl. No.: 672,952

[22] Filed: Jul. 1, 1996

[51] Int. Cl.$^6$ .................................................. A01K 97/28
[52] U.S. Cl. .................. 242/443; 242/448; 43/1; 269/221; 269/907
[58] Field of Search ................... 43/1; 269/907, 269/242, 221; 242/443, 448

[56] References Cited

U.S. PATENT DOCUMENTS

| | | | |
|---|---|---|---|
| 106,224 | 8/1870 | Skinner | 269/242 |
| 968,038 | 8/1910 | Everest | 269/242 |
| 1,318,814 | 10/1919 | Soultanian | 269/242 |
| 2,332,655 | 10/1943 | Miles | 242/7 |
| 2,486,142 | 9/1949 | Fong | 43/1 |
| 2,599,174 | 6/1952 | Hauser | 269/221 |
| 3,060,613 | 9/1962 | Murray | 43/1 |
| 4,134,577 | 1/1979 | Price et al. | 269/71 |
| 4,169,562 | 10/1979 | Renzetti | 242/7.01 |
| 4,184,645 | 1/1980 | Starling | 269/7 |
| 4,216,948 | 8/1980 | Carter | 269/71 |
| 4,322,065 | 3/1982 | Doiron | 269/254 |
| 4,375,284 | 3/1983 | Doiron | 269/236 |
| 4,544,145 | 10/1985 | Norlander | 269/69 |
| 4,969,636 | 11/1990 | Gautam | 269/71 |
| 5,165,673 | 11/1992 | Newton, Jr. | 269/69 |
| 5,169,079 | 12/1992 | Renzetti | 43/1 |
| 5,230,177 | 7/1993 | Hanley | 43/1 |

*Primary Examiner*—Katherine Matecki
*Attorney, Agent, or Firm*—Michael A. Capraro

[57] ABSTRACT

An electric rotary tying device system used for tying fishing flies that provides an in-line rotational drive system contained in a rotatably, elevationally and angularly adjustable main housing. Fully adjustable gripping means are nondestructive and are used to tie regular fishing flies while a modified gripping means allows the tying of tube flies. A fully reversible, bi-directional, variable speed, low voltage drive means and rotatable in-line drive system is controlled by a variable speed foot switch to provide variable rotation to the gripping means. The foot operated control switch frees both hands when tying a fishing fly thereby providing greater control over the precise positioning and tensional wrapping of fly tying material. A plurality of accessory bores and a movable mounting member provide attachment points for various accessories.

24 Claims, 6 Drawing Sheets

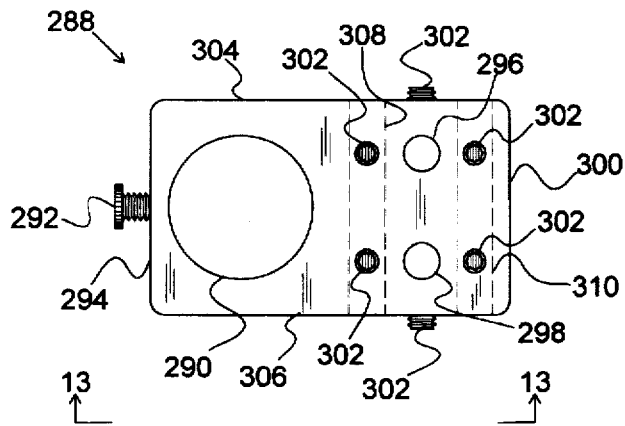
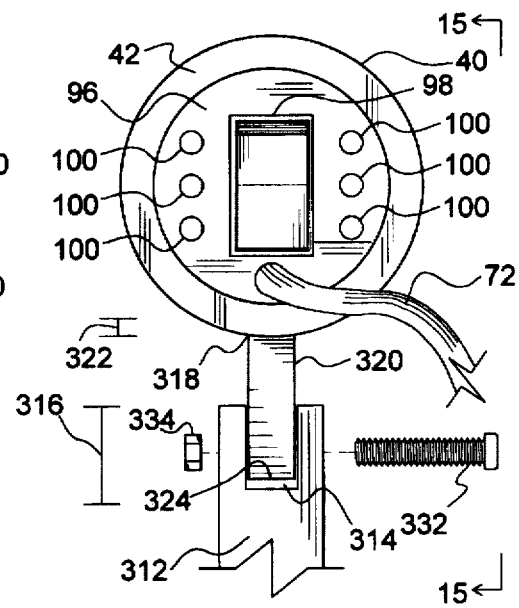
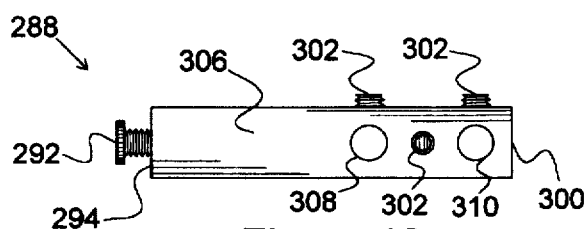
Figure 12
Figure 13
Figure 14
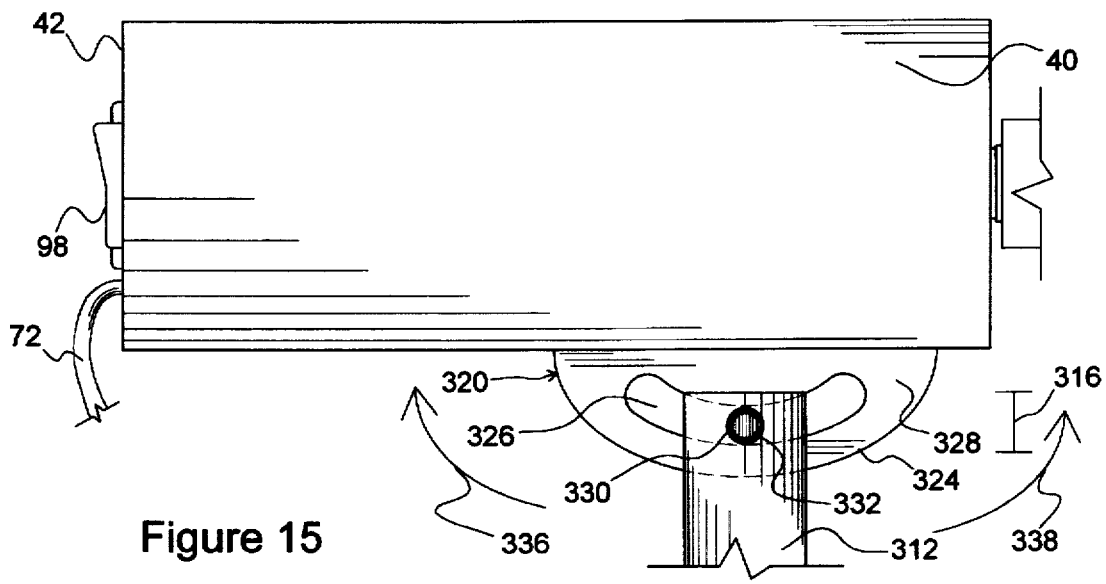
Figure 15

1

ELECTRIC ROTARY TYING DEVICE SYSTEM

BACKGROUND OF THE INVENTION

This invention relates generally to a tying device and more specifically to a new and novel electric rotary tying device system. The new and novel electric rotary tying device system is designed to be used with a variety of objects that are held in vise-like clamps such as fishing hooks, fly tubes and similar objects. The new and novel electric rotary tying device system is also designed to allow attachment of thread, bobbins, rods and other accessories near and around the tying device.

Fishing flies are generally assembled in a rotary fly tying device that holds and rotates a fish hook, the shank of a fish hook being rotated about a longitudinal central axis. As the fish hook is rotated in a fly tying device, a tier applies various combinations of thread, body material, floss, tinsel, feathers, hair, fur, wool and other materials to the hook shank, thereby producing an artificial fishing fly. Prior art tying devices, and specifically prior art rotary fly tying devices, require a tier to rotate vise-like hook jaws or clamps by hand or through a series of complex inertia producing components. See for example U.S. Pat. No. 4,544,145, Norlander; U.S. Pat. No. 5,165,673, Newton, Jr.; and U.S. Pat. No. 4,169,562, Renzetti. These types of prior art fly tying devices require a tier to use one hand to control the rotational rate of the device, while controlling wrapping or tying material tension with the other hand. This is a cumbersome and awkward procedure and often results in poorly tied fishing flies.

Most prior art rotary fly tying devices have complicated non-linear or angled rotational components and joints, the vise-like hook jaws or clamps often being angled toward a rotational center, resulting in complicated procedures being required to properly seat a fish hook in the prior art device. These non-linear, off-centered rotational components and joints are often intrusive in the fly tying process and can even be dangerous. A tier may inadvertently place a finger or hand in the rotational path while the device is in rotational motion causing serious injury to the tier. These types of prior art tying devices are also cumbersome and require routine maintenance for proper operation.

The rotational components of many prior art fly tying devices are also self-centering so that the vise-like hook jaws or clamps always come to rest at a given position. Many fly tying procedures require that the fish hook be turned or rotated and locked into a specific position so that special garnishment may be attached or for other types of manipulation. Self-centering prior art tying devices are equipped with a variety of detents, lock pins and other means to prevent unwanted rotation of the fish hook during non-rotational tying procedures. Utilizing these types of mechanisms to lock a fish hook in a certain position can be time consuming. Additionally, the relative number of available locking positions is often limited in these types of prior art fly tying devices.

The vise-like hook jaws or clamps on prior art fly tying devices usually have levers, cams, or other mechanisms which apply pressure to jaws or clamps that hold a fish hook in place. These types of mechanisms often apply too much pressure to the fish hook, resulting in broken, bent or damaged fish hooks or even resulting in broken jaws, sleeves, cam pins or clamps. Also, it is difficult to reproduce the correct jaw or clamp pressure when alternating hook sizes with these types of mechanisms. That is, if a tier produces a series of fishing flies using a #24 hook, the vise-like hook jaws or clamps are set to properly grasp that size hook. If the tier then ties a series of fishing flies using a #18 hook, the vise-like hook jaws or clamps will be set to properly grasp a #18 hook. However, if the tier then changes back to using a #24 hook, the first hook size, it is difficult to reproduce the first jaw or clamp pressure setting. Another disadvantage of most prior art vise-like hook jaws, is that they grasp the fish hook beyond the hooking portion and expose only the hook shank for tying, thus, these types of devices can prevent the tying of extended body flies. Additionally, the prior art fly tying devices vise-like hook jaws or clamps are designed only to tie material to a hook shank and cannot be utilized to tie tube flies, fishing flies in which materials are tied around a tube, the shank portion of a fish hook, or the fishing line directly above the fish hook, then being inserted through the tube fly.

Some prior art fly tying devices offer little in the way of accessory attachments or provide such complicated devices that the work area is often cluttered and disordered. For example, a small clipping bag is often provided to catch fly tying materials that are clipped or trimmed from a fishing fly in the finishing process. These bags can be difficult to set up and use. Many tiers avoid them completely, simply letting the clippings fall where they may.

SUMMARY OF THE INVENTION

To overcome the before described considerations and problems inherent in and encountered with prior art tying devices, there is provided by the subject invention a unique electric rotary tying device system that provides an in-line rotational drive system and fully adjustable non-destructive gripping means. The electric rotary tying device system is also designed to be rotationally and elevationally adjustable and can be permanently or semi-permanently mounted or utilized while free-standing.

The new and novel electric rotary tying device system is comprised of an elongated base having an upstanding rod receptacle medially attached near an end of the elongated base. An elongated upstanding rod, is movably disposed in the upstanding rod receptacle, an end of the elongated upstanding rod being fixedly attached to a main housing containing a fully reversible, bi-directional, variable speed drive means and rotatable in-line drive system which rotates gripping means designed to removably grip or hold an object such as a fishing hook. The upstanding rod receptacle is designed to accept the elongated upstanding rod and to allow elevational movement of the elongated upstanding rod, thereby allowing height adjustment of the gripping means away from and toward the elongated base. The upstanding rod receptacle also allows rotational movement of the elongated upstanding rod, thereby allowing full 360° rotational adjustment of the gripping means to any position around the elongated base. In another embodiment, a modified elongated upstanding rod is designed to accept an adjusting plate fixedly and downwardly attached to the main housing allowing the main housing, and thus the gripping means, to be angularly adjusted.

At least one rod engaging means is disposed through an upper portion of the upstanding rod receptacle and removably secures the elongated upstanding rod within the upstanding rod receptacle after height and rotational adjustments have been made. Locking means movably encompass the elongated upstanding rod between the upper portion of the upstanding rod receptacle and the end of the elongated upstanding rod to additionally secure the elongated upstanding rod in the upstanding rod receptacle after height and rotational adjustment of the gripping means has been made.

A power cord is electrically connected to switching means in the end of the main housing and connects the electric rotary tying device system to a power source or supply such as an electrical outlet. A converter means and drive control means are interposed in the power cord between the power supply and the main housing. The converter means converts normal residential power voltage, usually 110–120 volts, to a safer low voltage of approximately 3–15 volts. The variable speed drive control means controls the amount of low voltage received by the drive means within the main housing and thus controls the rotational rate of the gripping means.

A plurality of holes are disposed through the elongated base allowing the electric rotary tying device system to be secured to a substrate such as a work bench, table top, or other suitable substrate. For non-permanent attachment of the electric rotary tying device system to a substrate, C-clamps or other clamping devices may be utilized to removably secure the elongated base of the electric rotary tying device system to a suitable substrate. Additionally, the electric rotary tying device system has been designed to have sufficient weight and balance to allow the electric rotary tying device to be utilized free standing, that is, without being secured to a substrate.

A plurality of accessory bores capable of accepting accessory rods provide attachment points for various accessories which may be utilized with the new and novel electric rotary tying device system. A movable mounting member having an accessory mounting bore disposed therein is also movably positioned over and along the elongated base of the electric rotary tying device system. A bore in the movable mounting member is also designed to accept an accessory rod and provide an adjustable attachment point for various accessories which may be utilized with the new and novel electric rotary tying device system. Additionally, an adjustable accessory block may be secured to the elongated upstanding rod to provide further accessory rod attachments points.

The rotatable in-line drive system and adjustable gripping means provide a safe, quick and efficient means to tie a series of like fishing flies. The drive control means is a foot operated variable speed switch allowing a tier to easily control the rotational rate of the gripping means, thereby freeing both hands for the fly tying process. This provides the tier with ample control over the wrapping tension and produces tightly wrapped fishing flies. Additionally, the in-line drive system of the new and novel electric rotary tying device system provides rotational resistance without the need for complicated locking mechanisms when the drive system components are not being turned by the drive means. Thus, the gripping means can be readily turned by hand to any desired rotational position and the gripping means will remain in that position allowing the tier to complete a tying operation, such as tying off or adding special materials to the fishing fly.

Since the drive means is fully reversible and bi-directional, the new and novel electric rotary tying device system can be utilized by either right-handed or lefthanded tiers and further, can be positioned in any desired location. The fully reversible bi-directional drive means also allows a tier to wrap fly materials in a clockwise direction or counter-clockwise direction around the fish hook as preferred by the tier and also allows fly tying material to be unwound from the fish hook if necessary. The variable speed drive control means allows the gripping means to be rotated at low speeds for delicate work or at high speeds for routine procedures and quick production of a series of like flies.

The fully rotatable and elevationally adjustable main housing allows the electric rotary tying device system to be adjusted for any type of fly tying procedure. For example, the main housing, and thus the gripping means, can be rotated away from a working surface to hang over a waste container for clipping or trimming procedures, eliminating the need for cumbersome clipping bags and accessories. Also, the fully rotatable and elevationally adjustable main housing allows a tier to position the electric rotary tying device system in a position best suited for the individual tier.

The gripping means are designed to firmly grasp a fish hook without marring, bending or breaking the fish hook and without damaging the gripping means itself. The gripping means are further designed having a recessed area allowing partial exposure of the hook portion of a fish hook thereby allowing parachute, gallows or extending body flies to be tied with the electric rotary tying device system. The gripping means can easily accommodate a wide variety of hook sizes and types. For example, hooks as small as #32 or larger than 20/0 can easily be used with the gripping means. In another embodiment, modified gripping means are provided allowing a tier to readily and easily tie tube flies. The modified gripping means are interchangeable with the gripping means and require no special tools or accessories for use. An elongated spacer is also provided for special tying situations, the elongated spacer being compatible with the gripping means and with the modified gripping means.

To achieve the foregoing and other advantages, the present invention provides a new and novel electric rotary tying device system having an in-line rotational drive system contained in a rotatably and elevationally adjustable main housing and fully adjustable non-destructive gripping means. Regular fishing flies as well as tube flies can be quickly produced utilizing the new and novel electric rotary tying device system. The electric rotary tying device system can be permanently or semi-permanently mounted or utilized while free-standing.

The more important features of the present invention have been broadly outlined in order that the detailed description thereof that follows may be better understood and in order that the present contribution to the art may be better appreciated. There are additional features of the invention that will be more fully described hereinafter and which, together with the features outlined above, will form the subject matter of the claims appended hereto. Those skilled in the art will appreciate that the conception, upon which the present disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory review the nature and essence of the technical disclosure of the application. The abstract is neither intended to define the invention of the application, which is measured by the claims, nor is it intended to be limiting as to the scope of the invention in any way.

Accordingly, it is an object and advantage of the invention to provide a new and novel electric rotary tying device system that provides an in-line rotational drive system.

Another object and advantage of the invention to provide a new and novel electric rotary tying device system that is rotatably, elevationally and angularly adjustable.

Another object and advantage of the invention to provide a new and novel electric rotary tying device system that provides a fully reversible, bi-directional, variable speed, low voltage drive means.

Another object and advantage of the invention is to provide a new and novel electric rotary tying device system that may be used with a variety of fish hooks.

Another object and advantage of the invention is to provide a new and novel electric rotary tying device system that may be used to quickly and efficiently produce a variety of tightly wrapped fishing flies.

Another object and advantage of the invention is to provide a new and novel electric rotary tying device system that may be used to produce a series of like fishing flies quickly and efficiently.

Another object and advantage of the invention is to provide a new and novel electric rotary tying device system that can be securely positioned for various fly tying procedures.

Another object and advantage of the invention is to provide a new and novel electric rotary tying device system that will not accidentally damage fish hooks.

Another object and advantage of the invention is to provide a new and novel electric rotary tying device system that is easily utilized mounted or free-standing.

Another object and advantage of the invention is to provide a new and novel electric rotary tying device system that can be easily positioned in a position best suited for an individual tier.

Still another object and advantage of the invention is to provide a new and novel electric rotary tying device system which may be easily and efficiently manufactured and marketed.

Yet another object and advantage of the invention is to provide a new and novel electric rotary tying device system which is of durable and reliable construction.

These and other objects and advantages will become apparent from review of the drawings and from a study of the Description of the Preferred Embodiment relating to the drawings which has been provided by way of illustration only.

BRIEF DESCRIPTION OF THE DRAWINGS

FIG. 12 is a top view of an adjustable accessory block of the new and novel electric rotary tying device system.

FIG. 13 is a side view of an adjustable accessory block taken along lines 13—13 of FIG. 12 of the drawings.

FIG. 14 is an exploded rear view of a portion of the new and novel electric rotary tying device system in an another embodiment.

FIG. 15 is a side view of a portion of the new and novel electric rotary tying device system in another embodiment taken along lines 15—15 of FIG. 14 of the drawings.

DESCRIPTION OF THE PREFERRED EMBODIMENT

Figure 1:
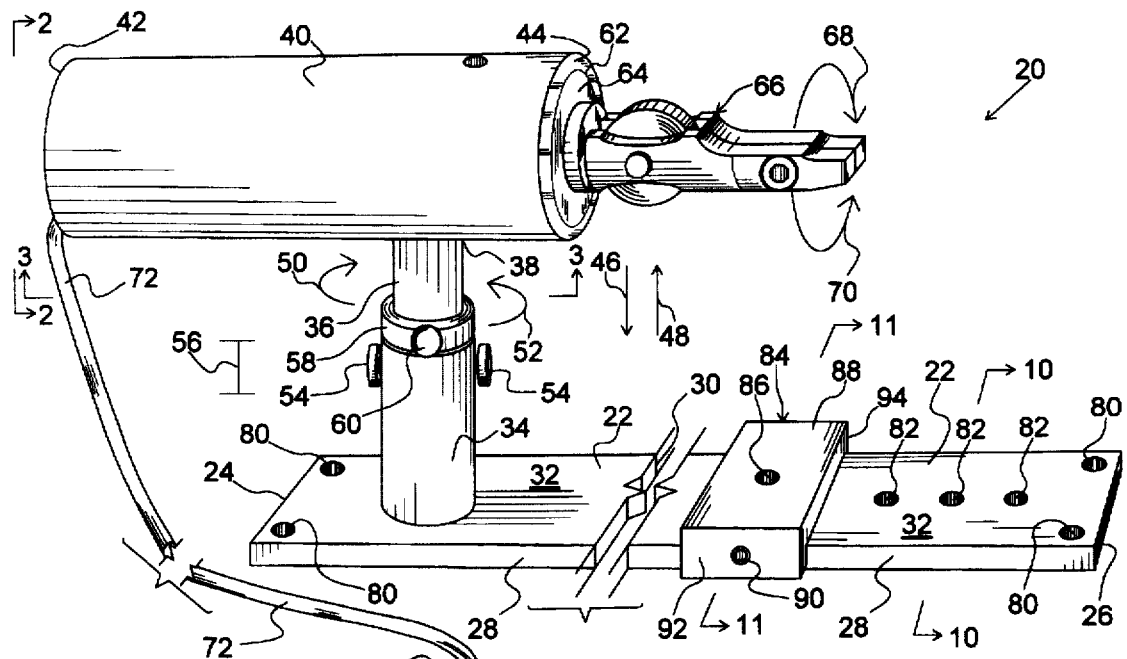
FIG. 1 is a perspective view of the electric rotary tying device system.

Referring to the drawings in general, the present description is given in the context of the new and novel electric rotary tying device system as utilized in tying fishing flies. It will be readily apparent to those skilled in the art that the usefulness of the present invention is not limited to this application and that changes could be made in construction and should be considered to be within the spirit and scope of the present invention.

Referring now in particular to FIG. 1 of the drawings, there is shown the new and novel electric rotary tying device, shown generally by the numeral 20. The electric rotary tying device 20 has been designed to be utilized with a variety of types and sizes of prior art fish hooks, prior art fish hooks not shown in FIG. 1. FIG. 1 of the drawings is a perspective view of the electric rotary tying device system 20.

An elongated base 22, having an end 24, an opposite end 26, a side 28, an opposite side 30 and surface 32, has fixedly attached thereto upstanding rod receptacle 34, the upstanding rod receptacle 34 being medially attached to the elongated base 22 on surface 32 near end 24. Elongated upstanding rod 36, is movably disposed in upstanding rod receptacle 34, an end 38 of elongated upstanding rod 36 being fixedly attached to main housing 40, the main housing 40 having an end 42 and an opposite end 44. The upstanding rod receptacle 34 is machined to accept the elongated upstanding rod 36 and to allow elevational movement of the elongated upstanding rod 36 in the direction of the arrows 46 and 48, thereby allowing height adjustment of the main housing 40 from the elongated base 22. The upstanding rod receptacle 34 also allows rotational movement of the elongated upstanding rod 36 in the direction of the arrows 50 and 52, thereby allowing full rotational adjustment of the main housing 40 to any position around the elongated base 22.

At least one rod engaging means 54 is radially disposed through upper portion 56 of the upstanding rod receptacle 34, the at least one rod engaging means 54 removably securing the elongated upstanding rod 36 within the upstanding rod receptacle 34 after height and rotational adjustments have been made. Locking means 58 movably encompasses elongated upstanding rod 36 between the upper portion 56 of the upstanding rod receptacle 34 and the end 38 of the elongated upstanding rod 36. At least one engaging means 60 is radially disposed through locking means 58, the at least one engaging means 60 also removably securing the elongated upstanding rod 36 within the locking means 58. The locking means 58 is provided to additionally secure the elongated upstanding rod 36 after height and rotational adjustment of the main housing 40 has been made by removably securing the elongated upstanding rod 36 and contacting the upper portion 56 of the upstanding rod receptacle 34, thereby preventing downward slippage of the elongated upstanding rod 36.

In the Preferred Embodiment and in FIG. 1 of the drawings, the at least one rod engaging means 54 and the at least one engaging means 60 are thumb screws threadedly disposed through the upper portion 56 of the upstanding rod receptacle 34 and through locking means 58, respectively. Other means of removable engagement known in the art may also be used and are considered to be within the spirit and scope of the present invention. Also in the Preferred Embodiment, and in FIG. 1 of the drawings, the locking means 58 is a slip collar having two at least one engaging means 60 radially and oppositely disposed through the locking means 58. Other locking means known in the art may also be used and are considered to be within the spirit and scope of the present invention.

Retaining means 62 is fixedly attached in main housing 40, the retaining means 62 being attached so that front surface 64 of the retaining means 62 is flush with opposite end 44 of the main housing 40. Gripping means, shown generally by the numeral 66, is centrally and removably attached to a threaded chuck or spindle centrally and rotatably disposed through retaining means 62, the gripping means 66 being designed to removably grip or hold an object such as a fishing hook and the like. A threaded chuck or spindle is rotatably driven by drive means contained within the main housing 40 and in turn rotates the gripping means 66 in the direction of the arrows 68 and 70. A threaded chuck and drive means contained within the main housing 40 can not be seen in FIG. 1 of the drawings, but will be shown and discussed more fully hereinafter. The attachment of retaining means 62 to the main housing 40, the central rotatable disposition of a threaded chuck or spindle through the retaining means 62 and the removable attachment of gripping means 66 to a threaded chuck, also will be discussed more fully hereinafter.

Still referring to FIG. 1 of the drawings there is shown a power cord 72 exiting the electric rotary tying device system 20 at end 42 of the main housing 40. The power cord 72 is electrically connected to switching means contained within the main housing 40, the switching means not shown in FIG. 1 of the drawings for purposes of clarity, but shown and discussed hereinafter. Power cord 72 connects to a power source or supply, such as an electrical outlet, and has converter means 74 and drive control means 76 interposed between the power supply and the main housing 40. The converter means 74 converts normal residential power voltage, usually 110–120 volts, to a safer low voltage of approximately 3–15 volts. Drive control means 76 controls the amount of low voltage received by drive means within the main housing 40 and thus controls the rotational rate of the gripping means 66 as will be discussed more fully hereinafter.

In the Preferred Embodiment, and in FIG. 1 of the drawings, converter means 74 is a voltage converter formed on electrical plug 78. In another embodiment, converter means 74 is a voltage converter interposed between electrical plug 78 and drive control means 76. Also in the Preferred Embodiment, and in FIG. 1 of the drawings, drive control means 76 is a variable speed foot switch interposed between converter means 74 and main housing 40, the power cord 72 length between the drive control means 76 and main housing 40 being sufficient to allow desired placement of the drive control means 76 for easy operation. Other converter means and other drive control means known in the art may also be used and are considered to be within the spirit and scope of the present invention. Standard wiring procedures known in the electrical arts are used to establish safe and secure electrical connections between power cord 72 and converter means 74, between power cord 72 and drive control means 76, and between power cord 72 and inner electrical components contained within main housing 40.

Still referring to FIG. 1 of the drawings there is shown a plurality of holes 80 disposed through elongated base 22. The plurality of holes 80 allow the elongated base 22 of the new and novel electric rotary tying device system 20 to be secured to a substrate such as a work bench, table top, or other suitable substrate. The elongated base 22 may be secured to a substrate using screws, bolt and nut combinations or other fastening means known in the art. For non-permanent attachment of the electric rotary tying device system 20 to a substrate, C-clamps or other clamping devices known in the art may be utilized to removably secure the elongated base 22 of the electric rotary tying device system 20 to a suitable substrate. Additionally, the electric rotary tying device system 20 has been designed to have sufficient weight and balance to allow the electric rotary tying device 20 to be utilized free standing, that is, without being secured to a substrate. Securing the electric rotary tying device system 20 to a substrate offers a more stable and secure means of utilizing the electric rotary tying device system 20.

Also shown in FIG. 1 of the drawings is a plurality of accessory bores 82 capable of accepting an accessory rod. The plurality of accessory bores 82 provide attachment points for various accessories and tools which may be utilized with the new and novel electric rotary tying device system 20 as will be discussed more fully hereinafter. The plurality of accessory bores 82 may be smooth, as illustrated in FIG. 1 of the drawings, or may be threaded bores. A movable mounting member, shown generally by the numeral 84, is movably positioned over and along the elongated base 22 of the electric rotary tying device system 20. Bore 86 is centrally disposed through main member 88, the main member 88 being horizontally positioned over the elongated base 22 and being parallel with surface 32 of the elongated base 22. The bore 86 is designed to accept an accessory rod and provide an adjustable attachment point for various accessories and tools which may be utilized with the new and novel electric rotary tying device system 20. Further, the accessory mounting bore 86 may be smooth, as illustrated in FIG. 1 of the drawings, or may be a threaded bore.

At least one mounting member engaging means 90 is removably and centrally disposed through a first side member 92, the first side member 92 being perpendicularly and downwardly attached to main member 88 and positioned parallel with the side 28 of the elongated base 22. The at least one mounting member engaging means 90 removably engages side 28 of the elongated base 22 to removably secure the movable mounting member 84 in a desired position along the elongated base 22. A second side member 94 is perpendicularly and downwardly attached to main member 88, opposite the first side member 92, and is positioned parallel with the opposite side 30 of the elongated base 22. Another at least one mounting member engaging means 90 may also be removably and centrally disposed through the second side member 94, the another at least one mounting member engaging means 90 removably engaging opposite side 30 of the elongated base 22 to removably secure the movable mounting member 84 in a desired position along the elongated base 22. In the Preferred Embodiment, and in FIG. 1 of the drawings, the at least one mounting member engaging means 90 is an allen head screw threadedly disposed through a centrally located threaded bore in side member 92 and second side member 94 of the movable mounting member 84. Other engaging means known in the art may also be used and are considered to be within the spirit and scope of the present invention.

Figure 2:
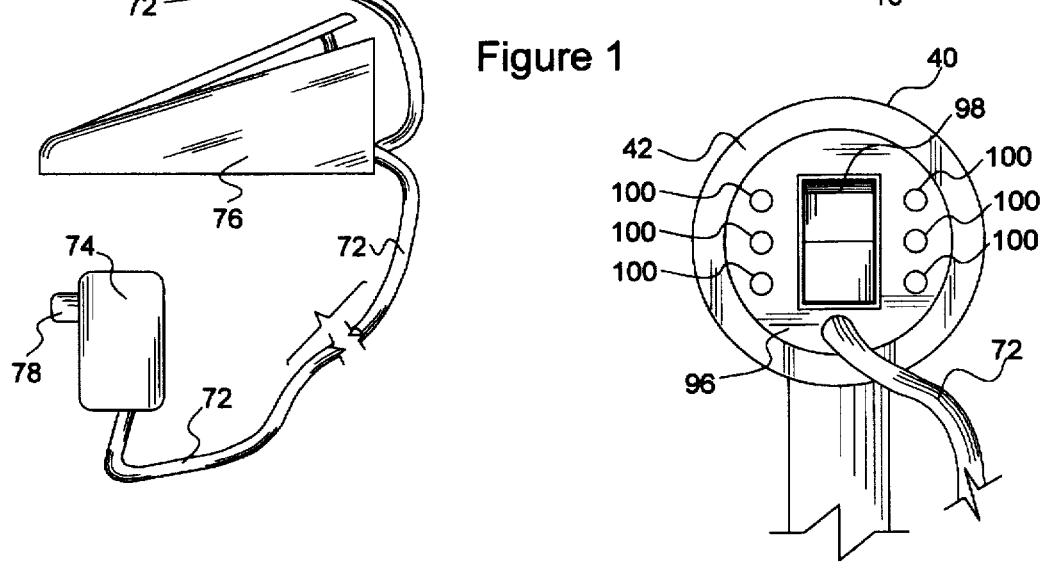
FIG. 2 is a rear view of the new and novel electric rotary tying device system taken along lines 2—2 of FIG. 1.

Referring now to FIG. 2 of the drawings there is shown a rear view of the new and novel electric rotary tying device system 20 taken along lines 2—2 of FIG. 1 of the drawings. Only a portion of the electric rotary tying device system 20 is shown in FIG. 2 of the drawings for purposes of clarity. Power cord 72 exits main housing 40 through end plate 96, the end plate 96 being retained in end 42 of the main housing 40. Switching means 98 is fixedly disposed in end plate 96, the switching means 98 being electrically connected to and interposed between the power cord 72 and a drive means contained within the main housing 40. A plurality of openings 100 are formed through end plate 96, the plurality of openings 100 providing ventilation for a drive means contained within the main housing 40. The electrical connections and drive means cannot be seen in FIG. 2 of the drawings but will be shown and described more fully hereinafter.

Figure 3:
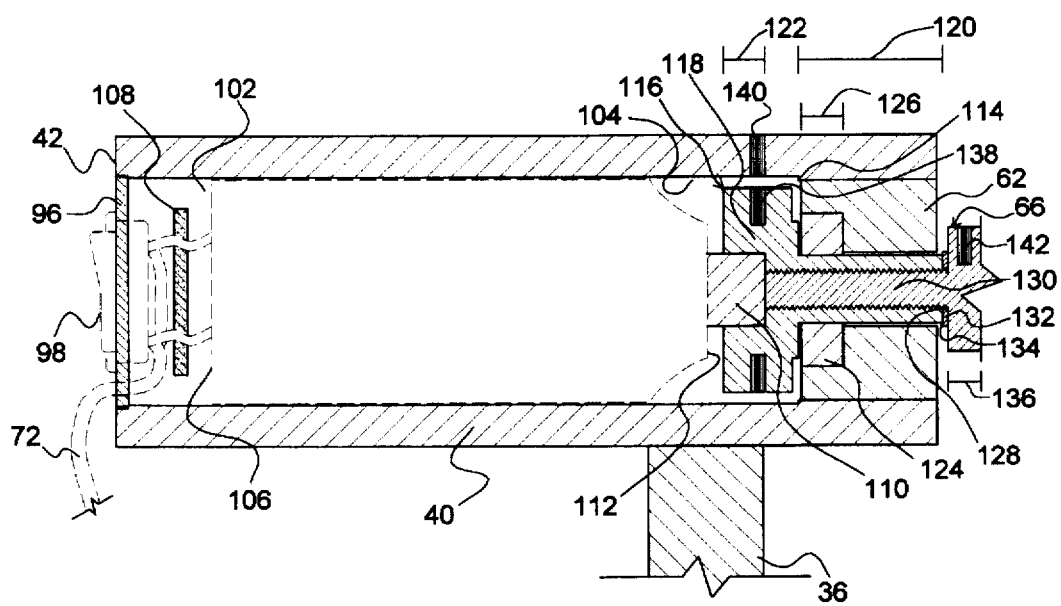
FIG. 3 is a cross sectional view of the new and novel electric rotary tying device taken along lines 3—3 of FIG. 1 of the drawings.

Referring now to FIG. 3 of the drawings, there is shown a cross sectional view of the new and novel electric rotary tying device 20 taken along lines 3—3 of FIG. 1 of the drawings. Main housing 40 is generally cylindrical, having a hollow inner area 102 and inner surface 104, the main housing 40 encompassing drive components which provide rotation of the gripping means 66, only a portion of the gripping means 66 being shown in FIG. 3 for purposes of clarity. Power cord 72 enters the hollow inner area 102 of the main housing 40 through end plate 96, and is electrically connected to switching means 98, the switching means 98 being electrically connected to drive means 106. A strain relief cord grip may be provided on the power cord 72 to alleviate stress on the cord 72 and to prevent damage to internal electrical connections. Standard wiring procedures known in the electrical arts are used to establish safe and secure electrical connections between power cord 72 and switching means 98 and drive means 106. The power cord 72, switching means 98 and drive means 106 are illustrated in dashed lines in FIG. 3 of the drawings for purposes of clarity.

Insulating means 108 is positioned in the hollow inner area 102 of the main housing 40 between the switching means 98 and the drive means 106 to provide shielding of electrical connections of the power cord 72 and switching means 98 from the drive means 106. In the Preferred Embodiment and in FIG. 3 of the drawings, the insulating means 108 is non-conducting fiber material. Other non-conducting materials providing suitable electrical insulation known in the art may also be used and are considered to be within the spirit and scope of the present invention.

Also in the Preferred Embodiment, the drive means 106 is a low voltage, fully reversible, bi-directional, variable speed electrical motor, capable of producing rotational cycles of 0 to approximately 150 revolutions per minute, or RPM. Converter means 74, not shown in FIG. 3 of the drawings but shown in FIG. 1, is a voltage converter capable of reducing or converting typical residential current, usually 110 volts to 120 volts, to low voltage of approximately 3–15 volts. The drive control means 76, also not shown in FIG. 3 of the drawings but shown in FIG. 1, a variable speed foot-switch in the Preferred Embodiment, then controls the revolutions or speed of the drive means 106, from rotational cycles of 0 to approximately 150 revolutions per minute, or RPM. Thus, the drive control means 76 not only controls the revolutions or speed of the drive means 106, the drive control means 76 also serves as an on-off switch either activating or deactivating drive means 106. Also, the switching means 98 is a single pole, double throw rocker switch capable of reversing the direction of the fully reversible low voltage, fully reversible, bi-directional, variable speed drive means 106. Other drive means, converters, drive control means and switching means known in the art may also be used and are considered to be within the spirit and scope of the present invention.

Still referring to FIG. 3 of the drawings, rotatable drive shaft 110 protrudes from end 112 of drive means 106, the rotatable drive shaft 110 being rotated by drive means 106. The drive means 106 is positioned within hollow inner area 102 of the main housing 40 with rotatable drive shaft 110 centrally and longitudinally oriented toward opposite end 44 of the main housing 40. Drive means stop rim 114 limits forward positioning of the drive means 106 within the main housing 40 during assembly of the inner components, the drive means stop rim 114 being circularly formed on the inner surface 104 of the main housing 40. In the Preferred Embodiment, the drive means 106 is secured to the inner surface 104 of the main housing 40 with silicon adhesive. Other suitable adhesives known in the art may also be used and are considered to be within the spirit and scope of the present invention.

A threaded chuck or spindle, shown generally by the numeral 116, having a body 118 and an extended shaft portion 120, is centrally fixedly attached to rotatable drive shaft 110. A centrally located opening formed in portion 122 of the body 118 of the threaded chuck 116 allows portion 122 of the body 118 to encompass rotatable drive shaft 110, the opening formed in portion 122 designed to fit over the rotatable drive shaft 110 in close tolerance. Extended shaft portion 120 of the threaded chuck or spindle 116 is continuously and centrally formed from body 118 opposite portion 122 and the attachment of the body 118 to the rotatable drive shaft 110, the extended shaft portion 120 being rotatably disposed through bearing means 124. The bearing means 124 is fixedly attached to retaining means 62 and encompasses extended shaft portion 120 of threaded chuck 116, allowing the extended shaft portion 120 to freely rotate within the bearing means 124. A centrally located opening formed in inner portion 126 of retaining means 62 allows inner portion 126 of the retaining means 62 to encompass bearing means 124, the opening formed in inner portion 126 also designed to fit over bearing means 124 in close tolerance. Inner portion 126 of the retaining means 62 is fixedly attached to the inner surface 104 of the main housing 40 so that front surface 64 of retaining means 62 is continuous or flush with opposite end 44 of the main housing 40.

In the Preferred Embodiment, the body 118 of the threaded chuck 116 is fixedly attached to the rotatable drive shaft 110, the bearing means 124 is centrally and fixedly attached to inner portion 126 of retaining means 62 and the retaining means 62 is fixedly attached to the inner surface 104 of the main housing 40 using metal to metal adhesive.

Additionally, a set screw or roll pin may also be radially disposed through portion 122 of the body 118 of the threaded chuck 116, thereby radially engaging the rotatable drive shaft 110 and further securing the threaded chuck or spindle 116 to the rotatable drive shaft 110. Similarly, a set screw or roll pin may also be radially disposed through the main housing 40 to radially engage retaining means 62 and further secure the retaining means 62 in the main housing 40. Other adhesives, methods and means of attachment known in the art may also be used and are considered to be within the spirit and scope of the present invention.

A threaded bore 128 is centrally and longitudinally disposed through extended shaft portion 120, the threaded bore 128 designed to receive and removably engage threaded anchor means 130 of the gripping means 66. Tension means 132 is interposed between end 134 of the threaded chuck 116 and flange portion 136 of the gripping means 66, the tension means 132 providing additional securing force when the threaded bore 128 of the threaded chuck 116 engages the threaded anchor means 130 of the gripping means 66. That is, when the gripping means 66 is engaged by the threaded bore 128 of the threaded chuck 116, the tension means 132 exerts force against the end 134 of the threaded chuck 116 and against the flange portion 136 of the gripping means 66 thereby further securing the gripping means 66 in the threaded chuck or spindle 116. In the Preferred Embodiment, the tension means 132 is a spring washer. Other tension means known in the art may also be used and are considered to be within the spirit and scope of the present invention.

Thus, as can be seen from FIG. 3 of the drawings, drive means 106 rotates rotatable drive shaft 110 which in turn rotates threaded chuck or spindle 116, the threaded chuck or spindle 116 being centrally and rotatably disposed through bearing means 124, the threaded chuck 116 in turn rotating the gripping means 66. Rotatable drive shaft 110, threaded chuck or spindle 116 and bearing means 124 collectively comprise an in-line drive system which rotates gripping means 66. A space is left between drive means 106 and threaded chuck 116 and between threaded chuck 116 and bearing means 124, thereby preventing binding of the components of the drive system during rotation. The end 134 of the threaded chuck or spindle 116 slightly protrudes from front surface 64 of retaining means 62 preventing binding of the gripping means 66 against the retaining means 62. Additionally, since the drive system provides rotational movement of the gripping means 66, the tension means 132 exerts force or pressure against the end 134 of the threaded chuck 116 and against the flange portion 136 of the gripping means 66 thereby preventing undesired rotational loosening of the gripping means 66 within the threaded bore 128 of the threaded chuck or spindle 116 when the rotational direction of the bi-directional drive means 106 is reversed.

Also shown in FIG. 3 is at least one hole or bore 138 radially disposed through the body 118 of the threaded chuck or spindle 116 near portion 122 of the body 118. The at least one hole or bore 138 aligns with bore 140, the bore 140 disposed through main housing 40 and above the body 118 of the threaded chuck 116. A rigid pin or shaft, such as the handle portion of an allen wrench, may be inserted through the bore 140, the gripping means 66 being rotated by hand until the at least one hole 138 aligns with the bore 140 and allows the rigid pin or shaft to drop into the at least one hole or bore 138, thereby locking the drive system in place and allowing removal or insertion of gripping means 66 from or into the threaded chuck or spindle 116. Chuck bore 142 is also provided in flange portion 136 to facilitate the removal or insertion of gripping means 66 from or into the threaded chuck or spindle 116. That is, a second rigid pin or shaft may be inserted into the chuck bore 142 while a first rigid pin or shaft locks the drive system in place, the second rigid pin or shaft being used to loosen or tighten the gripping means 66 in the threaded chuck or spindle 116.

Figure 4:
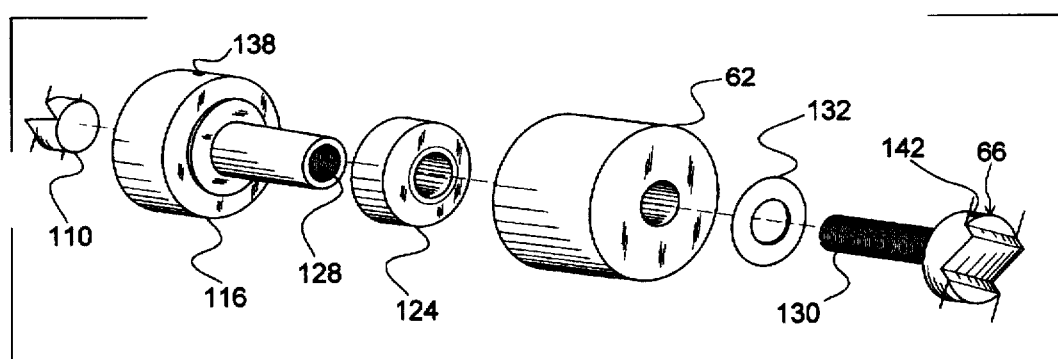
FIG. 4 is an exploded perspective view of in-line drive system components of the new and novel electric rotary tying device system.

Referring now to FIG. 4 of the drawings there is shown an exploded perspective view of the in-line drive system components of the new and novel electric rotary tying device system. FIG. 4 also better illustrates the correlation of the various components of the drive system. Each component, rotatable drive shaft 110, threaded chuck or spindle 116, bearing means 124, retaining means 62 and tension means 132 is balanced around a longitudinal center axis thereby maintaining a longitudinal center axis around which the gripping means 66 is rotated, resulting in a rotatably balanced in-line drive system. FIG. 4 also illustrates the threaded bore 128 of the threaded chuck or spindle 116 and the threaded anchor means 130 of the gripping means 66.

Figure 5:
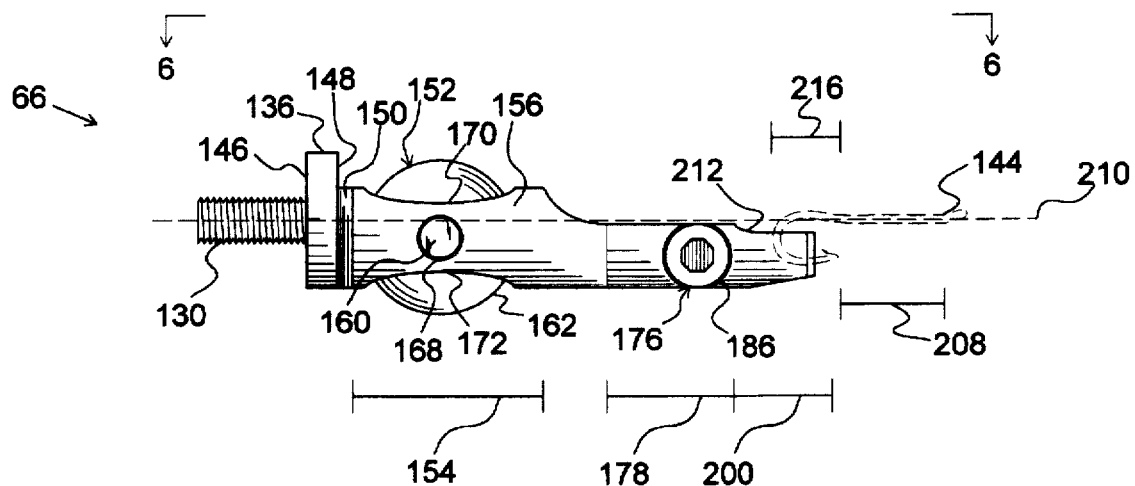
FIG. 5 is a side view of gripping means of the new and novel electric rotary tying device system.
Figure 6:
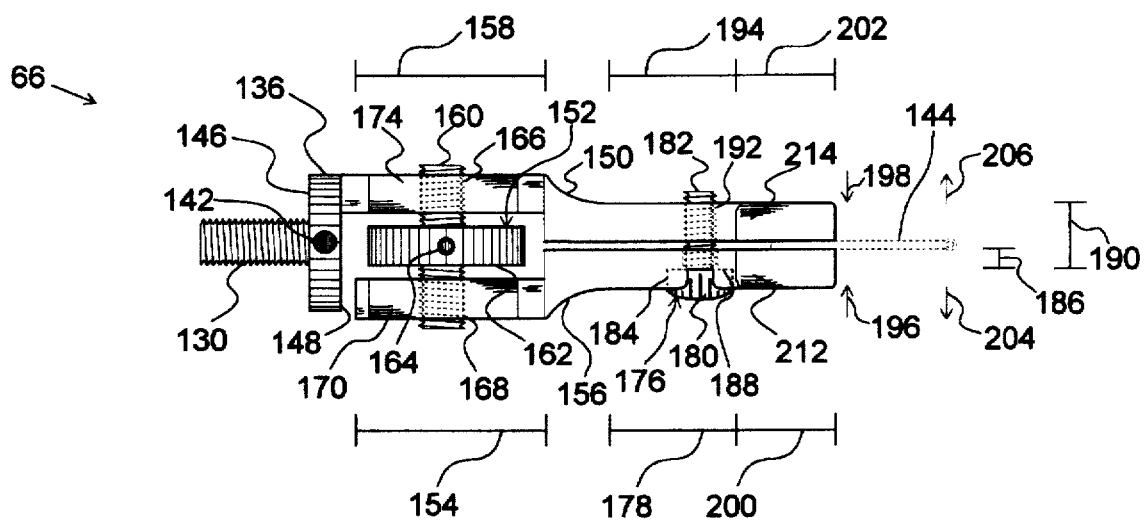
FIG. 6 is a top view of gripping means taken along lines 6—6 of FIG. 5 of the drawings.

Referring now in general to FIGS. 5 and 6 of the drawings there is shown gripping means, shown generally by the numeral 66. FIG. 5 is a side view of the gripping means 66. FIG. 6 is a top view of the gripping means 66 taken along lines 6—6 of FIG. 5 of the drawings. A prior art fish hook 144 is illustrated in dashed lines in FIGS. 5 and 6 for purposes of clarity.

A circular flange portion 136, having a back side 146 and a front side 148, has threaded anchor means 130 centrally and longitudinally formed on the back side 146. Elongated static gripping arm 150 is laterally formed on and extends away from the front side 148 of the flange portion 136. Primary adjusting means, shown generally by the numeral 152, movably connects body portion 154 of elongated moveable gripping arm 156 to body portion 158 of the elongated static gripping arm 150. That is, the elongated moveable gripping arm 156 and elongated static gripping arm 150 are movably connected by opposingly threaded axle 160, the axle 160 being threadedly disposed through body portion 154 of elongated moveable gripping arm 156 and through body portion 158 of elongated static gripping arm 150, respectively. The opposingly threaded axle 160 is also centrally disposed through thumb-wheel 162, the thumb-wheel 162 having at least one set screw 164 radially disposed therein, the at least one set screw 164 securing the thumb-wheel 162 to axle 160. The opposingly threaded axle 160 and the thumb-wheel 162 together comprise the primary adjusting means 152. FIG. 6 of the drawings illustrates how the thumb-wheel 162 is medially positioned between elongated static gripping arm 150 and elongated moveable gripping arm 156 by the opposingly threaded axle 160. FIG. 6 of the drawings also illustrates the disposition of the opposingly threaded axle 160 through threaded bore 166 of the elongated static gripping arm 150 and through threaded bore 168 of the elongated moveable gripping arm 156 The threaded bores 166 and 168 and portions of the opposingly threaded axle 160 shown in dashed lines in FIG. 6 for purposes of clarity.

FIG. 5 of the drawings illustrates upper primary adjusting means access cut-out 170 and lower primary adjusting means access cut-out 172, the upper primary adjusting means access cut-out 170 formed in the body portion 154 of the elongated moveable gripping arm 156 above the opposingly threaded axle 160, and the lower primary adjusting means access cut-out 172 formed in the body portion 154 below the opposingly threaded axle 160. Similar upper and lower primary adjusting means access cut-outs are formed in the body portion 158 of the elongated static gripping arm 150 and are mirror images of the cut-outs 170 and 172 shown in FIG. 5 of the drawings, the body portion 158 and the cut-outs formed in the elongated static gripping arm 150 not seen in FIG. 5, the body portion 158 and upper primary adjusting means access cut-out 174 shown in FIG. 6 of the drawings. Thus, there are two upper primary adjusting means access cut-outs, one formed above the opposingly threaded axle 160 in body portion 154 of the elongated moveable gripping arm 156, and another formed above the opposingly threaded axle 160 in body portion 158 of the elongated static gripping arm 150. Similarly, there are two lower primary adjusting means access cut-outs, one formed below the opposingly threaded axle 160 in body portion 154 of the elongated moveable gripping arm 156, and another formed below the opposingly threaded axle 160 in body portion 158 of the elongated static gripping arm 150. FIG. 6 of the drawings also shows upper primary adjusting means access cut-out 174 formed in the elongated static gripping arm 150, a lower primary adjusting means access cut-out cannot be seen in FIG. 6 but is formed in the elongated static gripping arm 150 directly below the opposingly threaded axle 160.

Still referring to FIGS. 5 and 6 of the drawings there is shown secondary adjusting means, shown generally by the numeral 176, medially disposed through front portion 178 of the elongated moveable gripping arm 156. Secondary adjusting means 176 has a head 180 and a shaft 182, the head 180 formed on an end of the shaft 182, the head 180 having a larger diameter than the shaft 182. Bore 184 is disposed through front portion 178 of the elongated moveable gripping arm 156, the bore 184 having a smooth portion 186 and a diameter larger than the shaft 182, thereby allowing the shaft 182 to freely rotate and move within bore 184. The head 180 of secondary adjusting means 176 contacts limiting means 188 which limits the disposition of the secondary adjusting means 176 through the bore 184, the bore 184 and the limiting means 188 shown in dashed lines in FIG. 6 for purposes of clarity. Distal portion 190 of the shaft 182 is threaded, the distal portion 190 being threadedly disposed through threaded bore 192, the bore 192 disposed through front portion 194 of the elongated static gripping arm 150. Thus, secondary adjusting means 176, comprised of head 180 and shaft 182 having a threaded distal portion 190, movably connects elongated moveable gripping arm 156 to elongated static gripping arm 150. Smooth bore 184, threaded bore 192, and a portion of the distal threaded portion 190 of the shaft 182 are shown in dashed lines in FIG. 6 of the drawings for purposes of clarity. In the Preferred Embodiment, secondary adjusting means 176 is an allen head screw. Other adjusting means known in the art may also be used and are considered to be within the spirit and scope of the present invention.

Referring now in particular to FIG. 6 of the drawings there will be described the operation of the gripping means 66 as utilized with a prior art fish hook 144, the prior art fish hook 144 shown in dashed lines in FIG. 6 for purposes of clarity. The elongated static gripping arm 150 and elongated moveable gripping arm 156 are designed to operate in a relatively parallel manner, providing gripping force in the direction of the arrows 196 and 198 at tip portions 200 and 202 of the gripping means 66. Tip portions 200 and 202 are separated in the direction of the arrows 204 and 206 by loosening the secondary adjusting means 176. Primary adjusting means 152 may also be rotated to separate the body portion 154 of the elongated moveable gripping arm 156 from the body portion 158 of the elongated static gripping arm 150. Upper primary adjusting means access cut-outs 170 and 174, as well as the lower primary adjusting means access cut-out 172 and its mirror image formed in elongated static gripping arm 150, the lower primary adjusting means access cut-out 172 and its mirror image not shown in FIG. 6, provide easy access to thumb-wheel 162 of the primary adjusting means 152.

For example, when a fly tier is producing a series of like flies, the primary adjusting means 152 is first rotated to bring the elongated static gripping arm 150 and the elongated moveable gripping arm 156 approximately parallel with one another. A prior art fish hook 144 having a particular size is then placed between tip portions 200 and 202 while the secondary adjusting means 176 is hand tightened so that the tip portions 200 and 202 just contact the prior art fish hook 144. Without disturbing the secondary adjusting means 176 setting, the prior art fish hook 144 is then removed from the tip portions 200 and 202 and inserted between the elongated static gripping arm 150 and elongated moveable gripping arm 156 just behind the secondary adjusting means 176, the primary adjusting means 152 then being rotated until the elongated static gripping arm 150 and the elongated moveable gripping arm 156 just contact the prior art fish hook 144. Again, without disturbing the primary adjusting means 152 setting, the prior art fish hook 144 is removed and then replaced between the tip portions 200 and 202, the secondary adjusting means 176 then being re-tightened to firmly grasp the prior art fish hook 144. Thus, when a tier finishes one fishing fly and is ready to tie another prior art fish hook 144 of the same size to continue the series of like flies, the tier need only to loosen the primary adjusting means 152 and remove the finished fishing fly, insert a new fish hook of the same size and then tighten the primary adjusting means 152. The tip portions 200 and 202 remain in parallel adjustment for subsequent prior art fish hooks of the particular size the tier is using to produce the series of like files.

Referring briefly to FIG. 5 of the drawings, it can be seen that gripping means 66 is designed to firmly grip a prior art fish hook 144 so that shank portion 208 is positioned along a longitudinal rotational center axis 210 of the gripping means 66, the longitudinal rotational center axis 210 shown as a dot-dash line for purposes of clarity. Thus, the shank portion 208 of prior art fish hook 144 is centrally rotated along the longitudinal rotational center axis 210 when the gripping means 66 is rotated by the drive system as previously described, allowing winding of various combinations of thread, body material, floss, tinsel, feathers, hair, fur, wool and other materials used in creating a fishing fly, onto the shank portion 208 of a prior art fish hook 144. Additionally, unlike some prior art fly tying devices, curved recesses 212 and 214, formed in tip portions 200 and 202 respectively, provide full access to the entire shank portion 208 of the prior art fish hook 144, allowing unencumbered tying of extended body flies and of trailing feathers and other materials directly adjacent to and even partially on the shank side of hook portion 216 of the prior art fish hook 144. Also, curved recesses 212 and 214 allow quick, easy and efficient fly tying on very small hooks that may be utilized in the fly tying process. Recess 212 is clearly shown in FIGS. 5 and 6, while recess 214 can be seen in FIG. 6 of the drawings.

Referring now to FIG. 6 of the drawings, there is shown the disposition of chuck bore 142 in the flange portion 136 of the gripping means 66. Chuck bore 142 is provided in flange portion 136 to facilitate the removal or insertion of gripping means 66 from or into the threaded chuck or spindle 116 as previously discussed, the threaded chuck or spindle 116 not shown in FIG. 6 of the drawings but clearly shown in FIGS. 3 and 4. In the Preferred Embodiment and in FIG. 6, the chuck bore 142 is radially disposed in flange portion 136 and medially oriented above upper primary adjusting means access cut-outs 170 and 174. Other suitable radial locations may also be used and are considered to be within the spirit and scope of the present invention.

Figure 7:
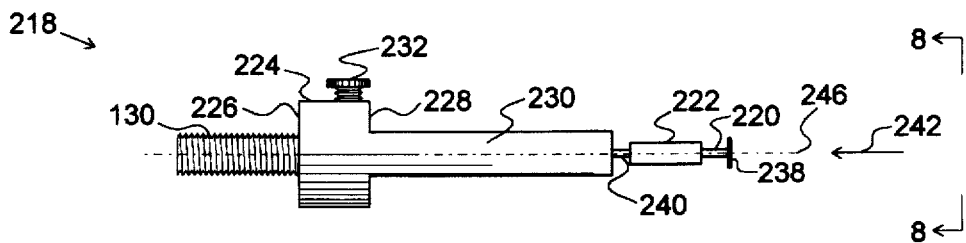
FIG. 7 is a side view of a modified gripping means of the new and novel electric rotary tying device system.
Figure 8:
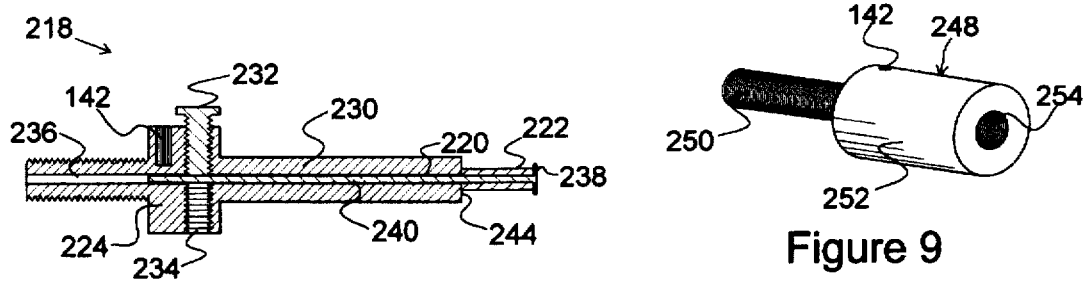
FIG. 8 is a cross sectional view of modified gripping means taken along lines 8—8 of FIG. 7 of the drawings.

Referring now in general to FIGS. 7 and 8 of the drawings there is shown a modified gripping means, shown generally by the numeral 218. Modified gripping means 218 is designed to quickly and efficiently create tube flies. Generally, tube flies are created by the attachment and winding of various combinations of thread, body material, floss, tinsel, feathers, hair, fur, wool and other materials used in creating a fishing fly, onto a hollow tube which slides over and encompasses the shank portion of a prior art fish hook or the fishing line directly above the fish hook.

Referring now in particular to FIG. 7 of the drawings there is shown a side view of a modified gripping means 218, having a tube pin, shown generally by the numeral 220, with prior art tube section 222 partially inserted therein. A modified circular flange portion 224, having a back side 226 and a front side 228, has threaded anchor means 130 centrally and longitudinally formed on the back side 226. Elongated cylinder 230 is centrally formed on and extends away from the front side 228 of the modified flange portion 224. Holding means 232, is threadedly disposed through a threaded bore 234 radially disposed through the modified flange portion 224 and intersecting a smooth bore 236, the threaded bore 234 and smooth bore 236 not shown in FIG. 7, but clearly seen in FIG. 8 of the drawings. In the Preferred Embodiment, the holding means 232 is a thumb-screw. Other threaded holding means known in the art may also be used and are considered to be within the spirit and scope of the present invention.

Still referring to FIG. 7 of the drawings, there is shown tube pin 220 having a head 238 formed on an end of elongated rod 240. Elongated rod 240 of tube pin 220 is inserted through a prior art tube section 222, the elongated rod 240 being longer than the prior art tube section 222. The exposed section of the elongated rod 240 is then inserted into the smooth bore 236 in the direction of the arrow 242, the smooth bore 236 not shown in FIG. 7, but clearly seen in FIG. 8 of the drawings.

Referring now to FIG. 8 of the drawings there is shown a cross sectional view of the modified gripping means 218 taken along lines 8—8 of FIG. 7 of the drawings, the tube pin 220 having been fully inserted into the smooth bore 236. Holding means 232 is threadedly disposed through threaded bore 234, the threaded bore 234 intersecting smooth bore 236 centrally and longitudinally disposed through the elongated cylinder 230. The smooth bore 236 is designed to receive the elongated rod portion 240 of tube pin 220 but is not large enough to receive the prior art tube section 222. Thus, when the tube pin 220 with elongated rod portion 240 is fully inserted into the smooth bore 236, head 238 of the tube pin 220 forces an end of the prior art tube section 222 against end 244 of the elongated cylinder 230. Holding means 232 is then rotated and tightened to contact and hold the elongated rod portion 240, thereby firmly securing the prior art tube section 222 to the modified gripping means 218.

Referring briefly back to FIG. 7 of the drawings, it can be seen that modified gripping means 218 is designed to firmly grip a tube pin 220 with prior art tube section 222 so that prior art tube section 222 is positioned along a longitudinal rotational center axis 246, the longitudinal rotational center axis 246 shown as a dot-dash line for purposes of clarity. Thus, the prior art tube section 222 is centrally rotated along the longitudinal rotational center axis 246 when the modified gripping means 218 is rotated by the drive system as previously described, allowing winding of various combinations of thread, body material, floss, tinsel, feathers, hair, fur, wool and other materials used in creating a tube fishing fly, onto the prior art tube section 222.

Referring back to FIG. 8 of the drawings, there is shown the disposition of chuck bore 142 in the modified circular flange portion 224 of the modified gripping means 218. Chuck bore 142 is provided in modified flange portion 224 to facilitate the removal or insertion of modified gripping means 218 from or into the threaded chuck or spindle 116 similar to the removal or insertion of gripping means 66 from or into the threaded chuck or spindle 116 as previously discussed, the threaded chuck or spindle 116 not shown in FIG. 8 of the drawings but clearly shown in FIGS. 3 and 4.

Figure 9:
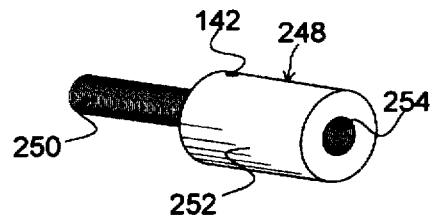
FIG. 9 is perspective view of an elongated spacer of the new and novel electric rotary tying device system.

Referring now to FIG. 9 and to the drawings in general, there is shown an elongated spacer, shown generally by the numeral 248, that may be utilized with the new and novel electric rotary tying device system 20, the elongated spacer 248 being positioned between the threaded chuck or spindle 116 and the gripping means 66 or modified gripping means 218. The threaded chuck or spindle 116, gripping means 66 or modified gripping means 218 are not shown in FIG. 9 of the drawings for purposes of clarity. FIG. 9 is a perspective view of the elongated spacer 248.

The elongated spacer 248 is generally cylindrical having threaded anchor means 250 centrally and longitudinally formed from an end of main body 252, and threaded bore 254 oppositely, centrally and longitudinally formed in main body 252. The threaded anchor means 250 is removably engaged by the threaded bore 128 of the threaded chuck or spindle 116 in the same manner as the threaded anchor means 130 of the gripping means 66 is removably engaged by the threaded bore 128 of the threaded chuck 116. The threaded bore 254 removably engages the threaded anchor means 130 of gripping means 66 or modified gripping means 218, in the same manner as the threaded chuck or spindle 116 engage the threaded anchor means 130 of the gripping means 66 or modified gripping means 218. The threaded bore 128, threaded chuck or spindle 116, threaded anchor means 130, gripping means 66 and modified gripping means 218 are not shown in FIG. 9, but are clearly shown in FIGS. 3, 4, and 5–8 of the drawings.

Still referring to FIG. 9 of the drawings there is shown a chuck bore 142 radially disposed in the main body 252 near the threaded anchor means 250. The chuck bore 142 is provided in elongated spacer 248 to facilitate the removal or insertion of elongated spacer 248 from or into the threaded chuck or spindle 116 similar to the removal or insertion of gripping means 66 from or into the threaded chuck or spindle 116 as previously discussed. The chuck bore 142 is also provided in elongated spacer 248 to facilitate the removal or insertion of gripping means 66 or modified gripping means 218 from or into the elongated spacer 248 similar to the removal or insertion of gripping means 66 from or into the threaded chuck or spindle 116. The threaded chuck or spindle 116, gripping means 66 and modified gripping means 218 are not shown in FIG. 9, but are clearly shown in FIGS. 3, 4, and 5–8 of the drawings.

Figure 10:
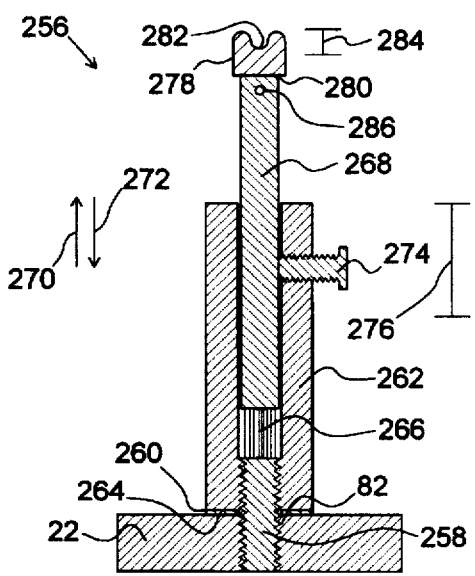
FIG. 10 is a cross-sectional view of an adjustable tool holding means attached to the new and novel electric rotary tying device system taken along lines 10—10 of FIG. 1 of the drawings.
Figure 11:
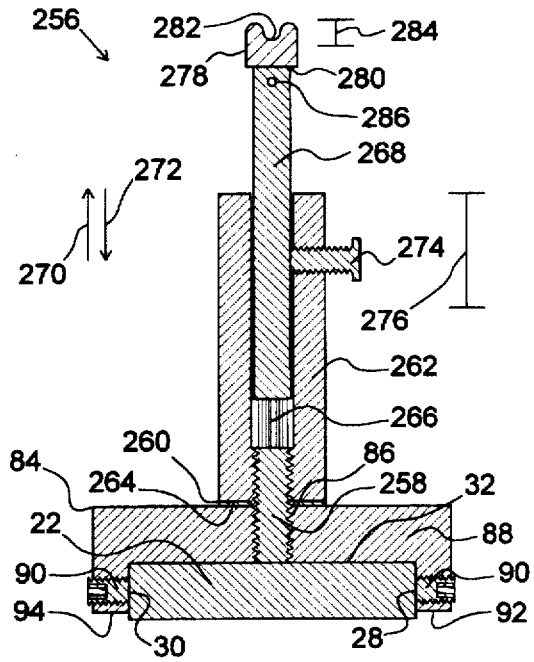
FIG. 11 is a cross-sectional view of cross-sectional view of an adjustable tool holding means attached to a movable mounting member on the electric rotary tying device system taken along lines 11—11 of FIG. 1 of the drawings.

Referring now in general to FIGS. 10 and 11 of the drawings there is shown an adjustable tool holding means, shown generally by the numeral 256. FIG. 10 is a cross-sectional view, illustrating the adjustable tool holding means 256 removably attached to the elongated base 22 of the new and novel electric rotary tying device system 20, taken along lines 10—10 of FIG. 1 of the drawings. FIG. 11 is also a cross-sectional view, illustrating the adjustable tool holding means 256 removably attached to the movable mounting member 84, movably positioned over and along the elongated base 22 of the electric rotary tying device system 20, taken along lines 11—11 of FIG. 1 of the drawings.

Referring now in particular to FIG. 10 of the drawings there is shown anchor means 258 centrally formed from end 260 of upstanding base cylinder 262, the anchor means 258 being removably anchored in one of a plurality of accessory bores 82 in elongated base 22. While the anchor means 258 illustrated in FIG. 10 is threaded, a non-threaded anchor means may be used with non-threaded plurality of accessory bores 82 as previously discussed. A washer 264 may be positioned between end 260 of the adjustable tool holding means 256 and elongated base 22 to provide more secure anchoring of the adjustable tool holding means 256 to the elongated base 22. Bore 266 is centrally and longitudinally disposed through upstanding base cylinder 262, the bore 266 capable of receiving adjustable tool rod 268, the adjustable tool rod 268 being movable in the bore 266 in the direction of the arrows 270 and 272. At least one rod engaging means 274 is radially disposed through upper portion 276 of the upstanding base cylinder 262, the at least one rod engaging means 274 removably engaging adjustable tool rod 268 when the adjustable tool rod 268 has been adjusted to a desired height.

Support means 278 is fixedly attached to end 280 of the adjustable tool rod 268, the support means 278 having a saddle or groove 282 medially formed in top portion 284 of the modified gripping means 218. In the Preferred Embodiment, the support means 278 is formed from nylon or polished metal, the saddle or groove 282 of the support means 278 providing a smooth surface along which fly tying thread and other materials may pass without becoming entangled, nicked, slit or otherwise damaged. Other materials providing a smooth, non-damaging surface known in the art may also be used and are considered to be within the spirit and scope of the present invention. A medially disposed hole 286 is transversely drilled through adjustable tool rod 268 below support means 278 and parallel to saddle 282, the hole 286 providing an attachment point for an accessory hook used to hold thread, bobbins, or other tools used in fly tying processes. An accessory hook is not shown in FIG. 10 of the drawings for purposes of clarity.

Referring now to FIG. 11 of the drawings there is shown the adjustable tool holding means 256 as removably attached to the movable mounting member, shown generally by the numeral 84, movably positioned over and along the elongated base 22. Anchor means 258 is removably anchored in accessory mounting bore 86 centrally disposed through main member 88, the main member 88 being horizontally positioned over the elongated base 22 and being parallel with surface 32 of the elongated base 22. While the anchor means 258 illustrated in FIG. 11 is threaded, a non-threaded anchor means may be used with a non-threaded accessory mounting bore 86 as previously discussed. A washer 264 may be positioned between end 260 of the adjustable tool holding means 256 and main member 88 of the movable mounting member 84.

FIG. 11 of the drawings also illustrates the positioning of the movable mounting member 84 on the elongated base 22, as well as the orientation of the attached first side member 92 and second side member 94, the side members 92 and 94 having at least one mounting member engaging means 90 disposed therein and removably engaging side 28 and an opposite side 30 of the elongated base 22, respectively. The movable mounting member 84 is designed to be movably adjustable along the elongated base 22 thereby allowing the adjustable tool holding means 256 to be located in a desired position along the elongated base 22.

Referring now in general to FIGS. 12 and 13 of the drawings, there is shown an adjustable accessory block, shown generally by the numeral 288. FIG. 12 is a top view of the adjustable accessory block 288. FIG. 13 is a side view of the adjustable accessory block 288, taken along lines 13—13 of FIG. 12 of the drawings.

Referring now in particular to FIG. 12 of the drawings there is shown accessory block bore 290 disposed through adjustable accessory block 288, the accessory block bore 290 being medially positioned off a center line of the adjustable accessory block 288. At least one rod engaging means 292 is disposed through end 294 of adjustable accessory block 288, the at least one rod engaging means 292 threadedly disposed through end 294 of the adjustable accessory block 288. In the Preferred Embodiment, the at least one rod engaging means 292 is an allen screw or thumb-screw. The accessory block bore 290 and the at least one rod engaging means 292 allows the adjustable accessory block 288 to be adjustably positioned around the elongated upstanding rod 36 of the new and novel electric rotary tying device 20, the elongated upstanding rod 36 not shown in FIG. 12, but clearly shown in FIG. 1 of the drawings.

Still referring to FIG. 12 of the drawings there is shown vertical accessory rod bores 296 and 298 disposed in adjustable accessory block 288, the accessory rod bores 296 and 298 being positioned between accessory block bore 290 and opposite end 300 of the adjustable accessory block 288. Accessory rod engaging means 302 are threadedly disposed through first side 304 and second side 306 of the adjustable accessory block 288, respectively, the accessory rod engaging means 302 removably engaging an accessory rod which may be inserted through accessory rod bore 296 or 298, an accessory rod not shown in FIG. 12 for purposes of clarity.

Accessory rod engaging means 302 are also threadedly disposed through bores in the top of the adjustable accessory block 288, the bores intersecting with horizontal accessory rod bores 308 and 310, the accessory rod bores 308 and 310 shown in dashed lines in FIG. 12 to illustrate the spatial relation of the horizontal accessory rod bores 308 and 310 to vertical accessory rod bores 296 and 298. Accessory rod engaging means 302 removably engage an accessory rod which may be inserted through accessory rod bore 308 or 310, an accessory rod not shown in FIG. 12 for purposes of clarity. Since the bores through which accessory rod engaging means 302 are disposed intersect the horizontal accessory rod bores 308 and 310, mirror image bores are also disposed in the bottom of the adjustable accessory block 288 allowing the entire adjustable accessory block 288 to be flipped thereby allowing the accessory rod engaging means 302 to engage an accessory rod from the bottom of the adjustable accessory block 288. In the Preferred Embodiment, the accessory rod engaging means 302 are allen screws. Other rod engaging means known in the art may also be used and are considered to be within the spirit and scope of the present invention.

Referring now to FIG. 13 of the drawings, there is shown a side view of the adjustable accessory block 288, taken along lines 13—13 of FIG. 12 of the drawings. FIG. 13 illustrates the position of the accessory rod engaging means 302 in second side 306, the position of the accessory rod engaging means 302 in first side 304 being a mirror image, and also illustrates the relative position of horizontal accessory rod bores 308 and 310. The adjustable accessory block 288 allows a variety of accessories to be in numerous alternate positions around the new and novel electric rotary tying device system 20.

Referring now in general to FIGS. 14 and 15 of the drawings, there is shown an embodiment of the electric rotary tying device system 20 wherein the main housing 40 is angularly adjustable. FIG. 14 is an exploded rear view of a portion of the electric rotary tying device system 20 showing an angularly adjustable main housing 40. FIG. 15 is a side view of a portion of the electric rotary tying device system 20 showing an angularly adjustable main housing 40 taken along lines 15—15 of FIG. 14 of the drawings.

Referring now in particular to FIG. 14 of the drawings, there is shown a modified elongated upstanding rod 312 having groove 314 medially formed in upper portion 316. The groove 314 is generally U-shaped and oriented parallel with a longitudinal axis of the main housing 40. Flat side 318 of adjusting plate 320 is fixedly attached to bottom portion 322 of the main housing 40, the adjusting plate 320 extending downwardly away from the main housing 40, curved side 324 of adjusting plate 320 being movably disposed in groove 314. Referring briefly to FIG. 15, the adjusting plate 320 is generally semi-circular, having curved opening 326 concentricly formed in body 328 of the adjusting plate 320 near curved side 324. Curved opening 326 aligns with bore 330 transversely disposed through upper portion 316 of modified elongated upstanding rod 312. Bolt 332 is disposed through bore 330, and thus through curved opening 326 of the adjusting plate 320, a threaded portion of the bolt 332 exiting the modified elongated upstanding rod 312. Referring back now to FIG. 14 nut 334 is threadedly attached to the bolt 332 thereby removably locking the adjusting plate 320 in the groove 314.

Referring now to FIG. 15 of the drawings, there is shown a side view of a portion of the electric rotary tying device system 20 showing an angularly adjustable main housing 40 taken along lines 15—15 of FIG. 14 of the drawings, the bolt 332 being fully inserted into bore 330. FIG. 15 illustrates the semi-circular nature of the adjusting plate 320 and the positioning of the concentricly formed curved opening 326, a portion of the curved opening 326 shown in dashed lines in FIG. 15 for purposes of clarity. Loosening the bolt 332 allows the main housing 40 to be angularly adjusted in the direction of the arrows 336 and 338. Once the desired angular elevation is achieved, the bolt 332 is tightened, the main housing 40 now being removably locked at the desired angular elevation. Angular adjustment of the main housing 40 may be necessary for certain fly tying procedures and other operations known in the art.

Figure 16:
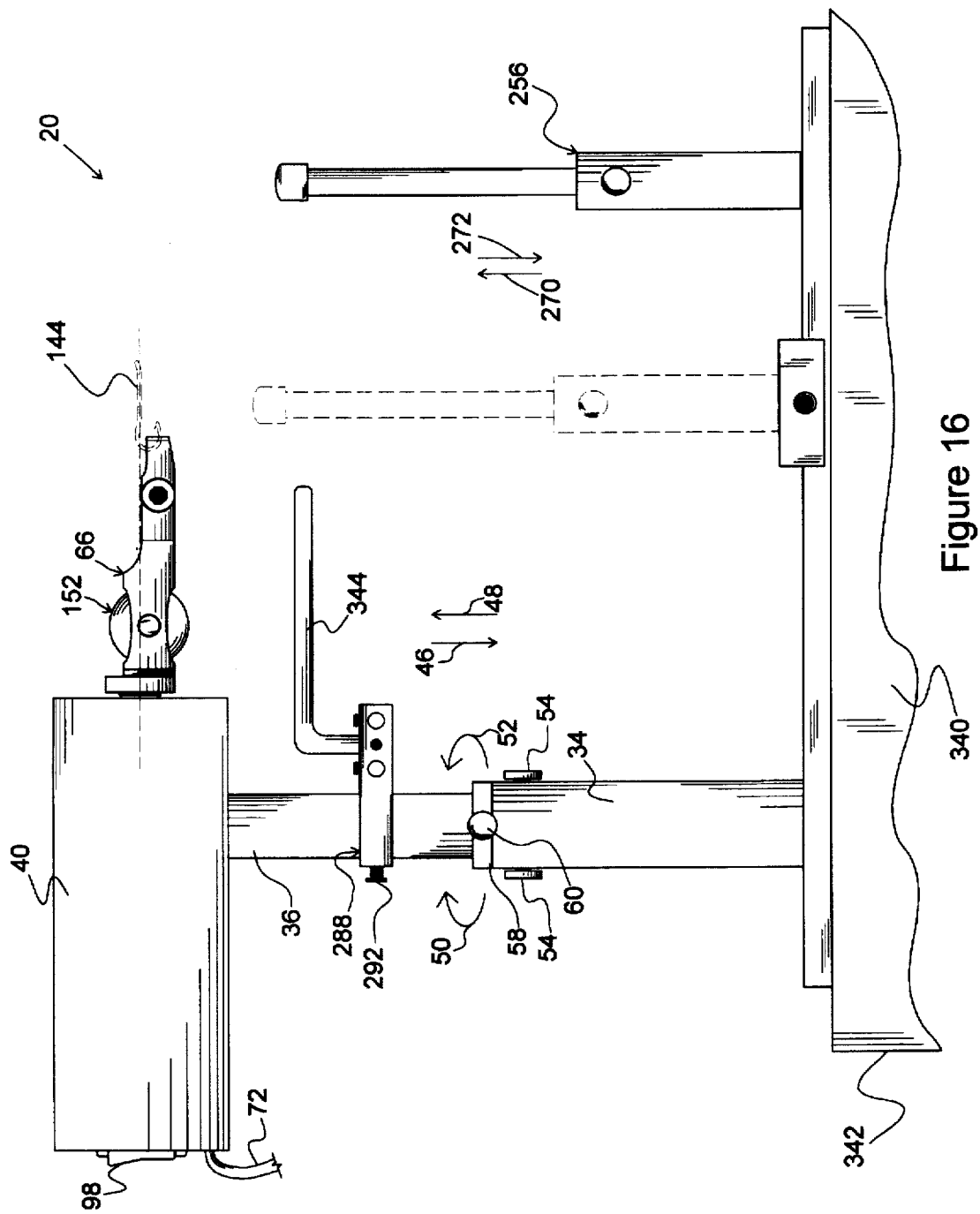
FIG. 16 is a side view of the new and novel electric rotary tying device system in place on a substrate.

Referring now to the drawings in general and in particular to FIG. 16 of the drawings, there is shown the new and novel electric rotary tying device system 20 in place on a substrate 340 such as a workbench, tying bench, table or other similar substrate. FIG. 16 is a side view of the electric rotary tying device system 20. In the Preferred Embodiment, elongated base 22, upstanding rod receptacle 34, elongated upstanding rod 36 and main housing 40 are constructed from rigid non-flexing material such as aluminum, steel, brass and other rigid non-flexing materials. Also in the Preferred Embodiment, gripping means 66 is constructed from stainless steel. Other metal alloys and other rigid non-flexing materials known in the art may also be used and are considered to be within the spirit and scope of the present invention.

Since the elongated upstanding rod 36, and thus the main housing 40, is fully rotatable about the elongated base 22 and is also elevationally adjustable, as previously described, the gripping means 66 can be rotated or elevated to any desired position required in the fly tying process. For example, after a fishing fly has been tied, it is often desirable to clip or trim excess fly material. The main housing 40 can be rotated 180° from the illustrated position so that the gripping means 66 extends beyond end 342 of the substrate 340, allowing a tied fly in the gripping means 66 to be positioned directly over a waste container, a waste container not shown in FIG. 16 of the drawings for purposes of clarity. This also eliminates the need for small clipping bags which are difficult to use and position beneath a tying device. Other procedures, daubing for example, may require a fish hook 144 to be specifically positioned or repositioned during the tying procedure, the prior art fish hook 144 shown in dashed lines in FIG. 16 for purposes of clarity. Additionally, the rotatably and elevationally adjustable main housing 40 allows a tier to locate the gripping means 66 in a position best suited to the individual tier.

Since the drive means 106 is fully reversible, switching means 98 reversing the direction of rotation of the in-line drive system, and thus of the gripping means 66, the new and novel electric rotary tying device system 20 can be easily positioned on a substrate 340 for either right-handed or left-handed tiers. Additionally, the drive control means 76 allows a tier to adjust the rate of rotation of the gripping means 66 for particular fly tying procedures. Rotational control of the gripping means 66 is critical in many tying procedures. For example, prior art hand operated tying devices rely on inertia for rotation of gripping means holding a fish hook. In order to maintain gripping means at a given rotational rate, the tier must use one hand to control the rotation of gripping means while controlling the tension of the tying material and the precise application of the tying material with the other hand. This greatly reduces the tightness of the wrap on the fly because it is very difficult to simultaneously maintain uniform wrapping tension, precise application and rotation. Unlike prior art tying devices, the new and novel electric rotary tying device system 20 utilizes drive means 106, rotation of the drive means 106 controlled by a variable speed foot switch, to provide a constant and uniform rotational rate, allowing the tier to use both hands to control the precise placement, tension and wrap of the tying material.

Also, in some tying procedures, such as tying off an end of wrapping material or adding special adornments, it is desirable to rotate a fish hook to gain access to the portion requiring manipulation. Many prior art devices require gripping means to be "locked off" after positioning to prevent unwanted rotation, and employ detents, lock pins and other means to prevent movement of gripping means during such non-rotational procedures. Unlike prior art devices, the new and novel electric rotary tying device system 20 allows the gripping means 66 to be rotated to and remain at any desired position without the need for "locking-off". The drive system of the electric rotary tying device system 20 provides rotational resistance when the drive system components are not being turned by the drive means 106. Thus, if it is desired to turn or rotate a fishing fly in the device to complete a tying operation, such as tying off, the gripping means 66 can be readily turned by hand to any desired rotational position, and will remain in that position until again rotated by hand or by the drive system. The drive means 106 and components of the in-line drive system are not seen in FIG. 16 but clearly illustrated in FIG. 3 of the drawings.

Still referring to FIG. 16 of the drawings it can be seen that a variety of tools and accessories can be positioned near and around the electric rotary tying device system 20. Adjustable tool holding means 256 is shown removably attached to the elongated base 22. A second adjustable tool holding means 256 could also be removably attached to the movable mounting member 84, the second adjustable tool holding means 256 shown in dashed lines in FIG. 16 of the drawings for purposes of clarity. Adjustable tool holding means 256 is designed to hold various fly tying accessories such as thread, bobbins, guides and other tying tools. Adjustable accessory block 288 allows additional accessories rods to be positioned around the electric rotary tying device system 20, an accessory rod 344 being shown in FIG. 16 of the drawings for purposes of illustration only. For example, the accessory rod 344 illustrated in FIG. 16 allows a tier to stop rotation of the fish hook 144 and temporarily tie off a wrapping thread around the accessory rod 344 to add special materials to a fishing fly, the accessory rod 344 maintaining tension on the wrapping thread. The above example and the accessory rod 344 shown in FIG. 16 is provided by way of illustration only. An accessory rods having other configurations may also be utilized with the adjustable accessory block 288 to hold other fly tying accessories such as thread spools, bobbins, gallows and other accessories or tools.

From the above it can be seen that the new and novel electric rotary tying device system accomplishes all of the objects and advantages presented herein before. Nevertheless it is within the spirit and scope of the invention that changes in the basic electric rotary tying device system may be made and the Preferred Embodiment and the modifications shown and described herein have only been given by way of illustration.

Having described my invention, I claim:

1. An electric rotary tying device system for tying fishing flies, the electric rotary tying device system removably and rotatably engaging a fish hook, the electric rotary tying device system allowing fly tying materials to be rotatably wound around portions of the fish hook, comprising:
    a. an elongated base having a side, an opposite side, an end, an opposite end and a surface;
    b. an upstanding rod receptacle fixedly attached to the elongated base near the end of the elongated base, the upstanding rod receptacle having an upper portion, the upper portion having at least one rod engaging means radially disposed therein;
    c. an elongated upstanding rod movably and rotatably disposed in the upstanding rod receptacle and removably engaged by the at least one rod engaging means, the elongated upstanding rod having an end;
    d. a main housing attached to the end of the elongated upstanding rod, the main housing having an end and an opposite end, the main housing encompassing a drive system having a threaded chuck centrally and rotatably disposed through the opposite end of the main housing;
    e. gripping means removably and rotatably engaged by the threaded chuck, the gripping means being rotated by the drive system and also being capable of removably gripping a fish hook; and
    f. a power cord disposed through the end of the main housing, the power cord being electrically connected to the drive system and to a power source, the power cord providing electrical power to the drive system to rotate the threaded chuck.

2. The electric rotary tying device system as defined in claim 1 wherein the main housing has a bottom portion, an adjusting plate being fixedly and downwardly attached to the bottom portion of the main housing, the adjusting plate further being removably engaged by a groove medialy formed in an upper portion of the elongated upstanding rod, the main housing being angularly adjustable on the elongated upstanding rod.

3. The electric rotary tying device system as defined in claim 1 wherein the gripping means have parallel, adjustable elongated gripping arms longitudinally formed thereon, the elongated gripping arms having tip portions wherein the tip portions removably grip a fish hook.

4. The electric rotary tying device system as defined in claim 1 wherein the gripping means has an elongated cylinder longitudinally formed thereon, the elongated cylinder having a smooth bore longitudinally disposed therethrough, the smooth bore being intersected by a threaded bore, the threaded bore having holding means disposed therein, wherein a tube pin is inserted through a tube section, the tube pin with tube section being inserted into the smooth bore, the holding means firmly holding the tube pin with tube section on the gripping means.

5. The electric rotary tying device system as defined in claim 1 wherein the elongated base has formed therein a plurality of accessory bores capable of accepting an adjustable tool holding means, the adjustable tool holding means further designed to hold various fly tying accessories.

6. The electric rotary tying device system as defined in claim 1 further comprising a movable mounting member movably positioned on and removably attached to the elongated base, the movable mounting member having an accessory mounting bore, the accessory mounting bore capable of accepting an adjustable tool holding means, the adjustable tool holding means further designed to hold various fly tying accessories.

7. The electric rotary tying device system as defined in claim 1 further comprising an adjustable accessory block removably engaging the elongated upstanding rod, the adjustable accessory block further designed to removably engage accessory tools.

8. The electric rotary tying device system as defined in claim 1 further comprising an adjustable tool holding means removably and adjustably disposed in one of the plurality of accessory bores, wherein the adjustable tool holding means holds various fly tying tools.

9. An electric rotary tying device system for tying fishing flies, the electric rotary tying device system removably and rotatably engaging a fish hook, the electric rotary tying device system allowing fly tying materials to be rotatably wound around portions of the fish hook, comprising:
    a. an elongated base having a side, an opposite side, an end, an opposite end and a surface;
    b. an upstanding rod receptacle medially and fixedly attached to the elongated base near the end of the elongated base, the upstanding rod receptacle having an upper portion, the upper portion having at least one rod engaging means radially disposed therein;
    c. an elongated upstanding rod having an end and being movably and rotatably disposed in the upstanding rod receptacle, the elongated upstanding rod being rotatably and elevationally adjustable within the upstanding rod receptacle and removably engaged by the at least one rod engaging means radially disposed in the upstanding rod receptacle;
    d. a main housing attached to the end of the elongated upstanding rod, the main housing having an end, an opposite end and an inner surface, wherein retaining means are fixedly attached to the inner surface of the main housing and flush with the opposite end of the main housing, the main housing encompassing a drive system having a threaded chuck centrally and rotatably disposed through the retaining means;

e. gripping means removably and rotatably engaged by the threaded chuck, the gripping means having a body portion and a tip portion and being rotated by the drive system, wherein curved recesses are formed in the tip portion, the tip portion removably gripping a fish hook; and f. a power cord disposed through the end of the main housing, the power cord being electrically connected the drive system and to a power source, the power cord providing electrical power to the drive system to rotate the threaded chuck, wherein converter means is interposed between the power source and the drive system, drive control means is interposed between the converter means and the drive system, and switching means is interposed between the drive control means and the drive system.

10. The electric rotary tying device system as defined in claim 9 wherein the main housing has a bottom portion, an adjusting plate being fixedly and downwardly attached to the bottom portion of the main housing, the adjusting plate further being removably engaged by a groove medially formed in an upper portion of the elongated upstanding rod, wherein the main housing is angularly adjustable on the elongated upstanding rod.

11. The electric rotary tying device system as defined in claim 9 wherein the gripping means have parallel, adjustable elongated gripping arms longitudinally formed thereon, the elongated gripping arms having tip portions wherein the tip portions removably grip a fish hook.

12. The electric rotary tying device system as defined in claim 9 wherein the gripping means has an elongated cylinder longitudinally formed thereon, the elongated cylinder having a smooth bore longitudinally disposed therethrough, the smooth bore being intersected by a threaded bore, the threaded bore having holding means disposed therein, wherein a tube pin is inserted through a tube section, the tube pin with tube section being inserted into the smooth bore, the holding means firmly holding the tube pin with tube section on the gripping means.

13. The electric rotary tying device system as defined in claim 9 wherein the elongated base has formed therein a plurality of accessory bores capable of accepting an adjustable tool holding means, the adjustable tool holding means further designed to hold various fly tying accessories.

14. The electric rotary tying device system as defined in claim 9 further comprising a movable mounting member movably positioned on and removably attached to the elongated base, the movable mounting member having an accessory mounting bore, the accessory mounting bore capable of accepting an adjustable tool holding means, the adjustable tool holding means further designed to hold various fly tying accessories.

15. The electric rotary tying device system as defined in claim 9 further comprising an adjustable accessory block removably engaging the elongated upstanding rod, the adjustable accessory block further designed to removably engage accessory tools.

16. The electric rotary tying device system as defined in claim 9 further comprising an adjustable tool holding means removably and adjustably disposed in one of the plurality of accessory bores, wherein the adjustable tool holding means holds various fly tying tools.

17. An electric rotary tying device system for tying fishing flies, the electric rotary tying device system removably and rotatably engaging a fish hook, the electric rotary tying device system allowing fly tying materials to be rotatably wound around portions of the fish hook, comprising:

a. an elongated base having a side, an opposite side, an end, an opposite end and a surface, the elongated base also having a plurality of holes disposed therein, the plurality of holes allowing the elongated base to be attached to a substrate;

b. an upstanding rod receptacle medially and fixedly attached to the elongated base near the end of the elongated base, the upstanding rod receptacle having an upper portion, the upper portion having at least one rod engaging means radially disposed therein;

c. an elongated upstanding rod having an end and being movably and rotatably disposed in the upstanding rod receptacle, the elongated upstanding rod being rotatably and elevationally adjustable within the upstanding rod receptacle, wherein the elongated upstanding rod is removably engaged by the at least one rod engaging means radially disposed in the upstanding rod receptacle after rotational and elevational adjustments are made;

d. a main housing attached to the end of the elongated upstanding rod, the main housing having an end, an opposite end, a hollow inner area and an inner surface, wherein retaining means are fixedly attached to the inner surface of the main housing and flush with the opposite end of the main housing and an end plate is attached to the end of the main housing;

e. drive means having an end and being longitudinally positioned within the hollow inner area of the main housing, the drive means having a rotatable drive shaft protruding from the end, the rotatable drive shaft and the end oriented toward the opposite end of the main housing;

f. a threaded chuck having a portion fixedly attached to the rotatable drive shaft of the drive means, the threaded chuck also having an extended shaft portion longitudinally formed from the portion and away from the attachment of the portion to the rotatable drive shaft, the extended shaft portion of the threaded chuck being centrally and rotatably disposed through the retaining means;

g. bearing means centrally fixedly attached to the retaining means, the bearing means encompassing the extended shaft portion of the threaded chuck, the threaded chuck being rotatable within the bearing means;

h. a threaded bore centrally and longitudinally disposed in the extended shaft portion of the threaded chuck;

i. gripping means having a flange portion, the flange portion having threaded anchor means centrally and longitudinally formed on a back side of the flange portion and away from the back side, the threaded anchor means being removably engaged by the threaded bore of the threaded chuck, the gripping means removably gripping a fish hook;

j. tension means interposed between the gripping means and the threaded chuck, the tension means exerting force on the gripping means and the threaded chuck to removably secure the gripping means to the threaded chuck;

k. a power cord electrically connected to a power source, the power cord disposed through the end plate of the main housing and providing electrical power to the drive means to rotate the threaded chuck, the power cord electrically connected to switching means within the hollow inner area of the main housing, the switching means connected to the drive means, the switching means switching the rotational direction of the drive means;

l. converter means electrically connected to the power cord between the power source and the switching means, the converter means converting residential voltage; and m. drive control means electrically connected to the power cord between the converter means and the switching means, the drive control means variably controlling rotational speed of the drive means, the drive means rotating the gripping means.

18. The electric rotary tying device system as defined in claim 17 wherein the main housing has a bottom portion, an adjusting plate being fixedly and downwardly attached to the bottom portion of the main housing, the adjusting plate further being removably engaged by a groove medially formed in an upper portion of the elongated upstanding rod, wherein the main housing is angularly adjustable on the elongated upstanding rod.

19. The electric rotary tying device system as defined in claim 17 wherein the gripping means have parallel, adjustable elongated gripping arms longitudinally formed thereon, the elongated gripping arms having tip portions wherein the tip portions removably grip a fish hook.

20. The electric rotary tying device system as defined in claim 17 wherein the gripping means has an elongated cylinder longitudinally formed thereon, the elongated cylinder having a smooth bore longitudinally disposed therethrough, the smooth bore being intersected by a threaded bore, the threaded bore having holding means disposed therein, wherein a tube pin is inserted through a tube section, the tube pin with tube section being inserted into the smooth bore, the holding means firmly holding the tube pin with tube section on the gripping means.

21. The electric rotary tying device system as defined in claim 17 wherein the elongated base has formed therein a plurality of accessory bores capable of accepting an adjustable tool holding means, the adjustable tool holding means further designed to hold various fly tying accessories.

22. The electric rotary tying device system as defined in claim 17 further comprising a movable mounting member movably positioned on and removably attached to the elongated base, the movable mounting member having an accessory mounting bore, the accessory mounting bore capable of accepting an adjustable tool holding means, the adjustable tool holding means further designed to hold various fly tying accessories.

23. The electric rotary tying device system as defined in claim 17 further comprising an adjustable accessory block removably engaging the elongated upstanding rod, the adjustable accessory block further designed to removably engage accessory tools.

24. The electric rotary tying device system as defined in claim 17 further comprising an adjustable tool holding means removably and adjustably disposed in one of the plurality of accessory bores, wherein the adjustable tool holding means holds various fly tying tools.

* * * * *